United States Patent
Yamasaki

(10) Patent No.: US 10,234,685 B2
(45) Date of Patent: Mar. 19, 2019

(54) HEAD-UP DISPLAY APPARATUS

(71) Applicant: CALSONIC KANSEI CORPORATION, Saitama (JP)

(72) Inventor: Naomi Yamasaki, Saitama (JP)

(73) Assignee: CALSONIC KANSEI CORPORATION (JP)

( * ) Notice: Subject to any disclaimer, the term of this patent is extended or adjusted under 35 U.S.C. 154(b) by 263 days.

(21) Appl. No.: 15/505,519

(22) PCT Filed: May 19, 2015

(86) PCT No.: PCT/JP2015/064347
§ 371 (c)(1),
(2) Date: Feb. 21, 2017

(87) PCT Pub. No.: WO2016/027531
PCT Pub. Date: Feb. 25, 2016

(65) Prior Publication Data
US 2017/0269362 A1 Sep. 21, 2017

(30) Foreign Application Priority Data
Aug. 22, 2014 (JP) ................................ 2014-169325

(51) Int. Cl.
*G02B 27/02* (2006.01)
*G02B 27/01* (2006.01)
*B60K 35/00* (2006.01)

(52) U.S. Cl.
CPC .......... *G02B 27/0101* (2013.01); *B60K 35/00* (2013.01); *G02B 27/01* (2013.01);
(Continued)

(58) Field of Classification Search
CPC ............ G02B 27/0101; G02B 27/0149; G02B 27/01; G02B 2027/015; G02B 2027/0145
See application file for complete search history.

(56) References Cited

U.S. PATENT DOCUMENTS

2009/0160736 A1  6/2009 Shikita
2009/0231722 A1  9/2009 Filipovich et al.
(Continued)

FOREIGN PATENT DOCUMENTS

CN  101464562 A  6/2009
CN  101577801 A  11/2009
(Continued)

OTHER PUBLICATIONS

International Search Report (English Translation) from PCT/JP2015/064347 dated Aug. 4, 2015 (1 page).

*Primary Examiner* — Joseph P Martinez
(74) *Attorney, Agent, or Firm* — Calfee, Halter & Griswold LLP

(57) ABSTRACT

To downsize a head-up display apparatus, a recess is provided by cutting a part of the reflection mirror having a quadrilateral shape as a basic shape. A head-up display apparatus includes, in a casing thereof, an image display and an optical path forming member. The optical path forming member includes at least a reflection mirror that reflects the image. The reflection mirror has a quadrilateral shape as a basic shape. The reflection mirror having the quadrilateral shape as the basic shape includes a recess in at least one of four corners. The reflection mirror having the quadrilateral shape as the basic shape is disposed in the casing to be inclined relative to a horizontal direction. The recess is provided in at least one of a top corner and a bottom corner which are diagonally placed in the inclined reflection mirror.

23 Claims, 4 Drawing Sheets

(52) U.S. Cl.
 CPC .. *G02B 27/0149* (2013.01); *B60K 2350/1072* (2013.01); *B60K 2350/2052* (2013.01); *B60K 2350/2065* (2013.01); *B60K 2350/921* (2013.01); *G02B 2027/015* (2013.01); *G02B 2027/0145* (2013.01)

(56) References Cited

U.S. PATENT DOCUMENTS

| | | |
|---|---|---|
| 2009/0278999 A1 | 11/2009 | Ofune et al. |
| 2010/0157175 A1 | 6/2010 | Suzuki et al. |
| 2010/0315270 A1 | 12/2010 | Filipovich et al. |
| 2013/0010366 A1 | 1/2013 | Nakamura et al. |
| 2013/0021224 A1 | 1/2013 | Fujikawa et al. |
| 2013/0314891 A1 | 11/2013 | Miyazawa et al. |
| 2015/0168730 A1 | 6/2015 | Ashkenazai et al. |
| 2017/0059370 A1 | 3/2017 | Miyazawa et al. |
| 2017/0059371 A1 | 3/2017 | Miyazawa et al. |

FOREIGN PATENT DOCUMENTS

| | | | | |
|---|---|---|---|---|
| CN | 101762961 A | 6/2010 | | |
| CN | 102449531 A | 5/2012 | | |
| CN | 102620192 A | 8/2012 | | |
| CN | 102834767 A | 12/2012 | | |
| CN | 202995138 U | 6/2013 | | |
| JP | 07134265 A | 5/1995 | | |
| JP | 2004-101829 | * | 4/2004 | ............ G02B 27/02 |
| JP | 2004-101829 A | 4/2004 | | |
| JP | 2008179218 A | 1/2007 | | |
| JP | 2012-47893 A | 3/2012 | | |
| JP | 2012154796 A | 8/2012 | | |
| JP | 2013-25205 A | 2/2013 | | |

* cited by examiner

HEAD-UP DISPLAY APPARATUS

CROSS-REFERENCE TO RELATED APPLICATIONS

This application is the 371 application of PCT Application No. PCT/JP2015/064347, filed May 19, 2015, which is based upon and claims priority to Japanese Patent Application No. 2014-169325, filed Aug. 22, 2014, the entire contents of which are incorporated herein by reference.

TECHNICAL FIELD

The present invention relates to a head-up display apparatus.

BACKGROUND ART

A head-up display apparatus has been known. The head-up display apparatus is configured to display an image such as driving information to be superimposed on an external landscape seen through a windshield of a vehicle (refer to Patent Literature 1, for example).

This head-up display apparatus includes inside a casing thereof an image display capable of displaying an image such as driving information, and an optical path forming member that guides the image displayed on the image display to a cabin. The optical path forming member includes at least a reflection mirror that reflects the image displayed on the image display.

CITATION LIST

Patent Literature

[Patent Literature 1] JP2013-25205A

SUMMARY

Technical Problem

In recent years, the head-up display apparatus is requested to project a larger image. The optical path forming member, in particular, the reflection mirror therefore increasingly increases in size.

As a result, the head-up display apparatus increases in entire size in accordance with the increase in the size of the reflection mirror. A vehicle is also requested to have a large space for mounting the head-up display apparatus.

It is, therefore, a main object of the present invention to solve the above-described increased size problem.

Solution to Problem

In order to solve the above problem, a head-up display apparatus includes, in a casing thereof, an image display that displays an image and an optical path forming member that guides to a cabin the image displayed on the image display, the optical path forming member including at least a reflection mirror that reflects the image displayed on the image display, and the head-up display apparatus displaying the image to be superimposed on an external landscape seen through a windshield of a vehicle, wherein the reflection mirror has a quadrilateral shape as a basic shape, the reflection mirror having the quadrilateral shape as the basic shape includes a recess in at least one of four corners, the reflection mirror having the quadrilateral shape as the basic shape is disposed in the casing to be inclined relative to a horizontal direction, and the recess is provided in at least one of a top corner and a bottom corner which are diagonally placed in the inclined reflection mirror.

Advantageous Effects

With the recess provided by cutting a part of the reflection mirror having the quadrilateral as the basic shape, it is possible to downsize the head-up display apparatus. With the recess provided in at least one of the top corner and the bottom corner, it is also possible to reliably reduce the height of the reflection mirror.

DESCRIPTION OF EMBODIMENTS

Hereinafter, an embodiment will be described with reference to the drawings. FIGS. 1 to 5 are views describing the embodiment.

[Embodiment 1]

(Configuration) Hereinafter, the configuration of the embodiment will be described.

Figure 1:
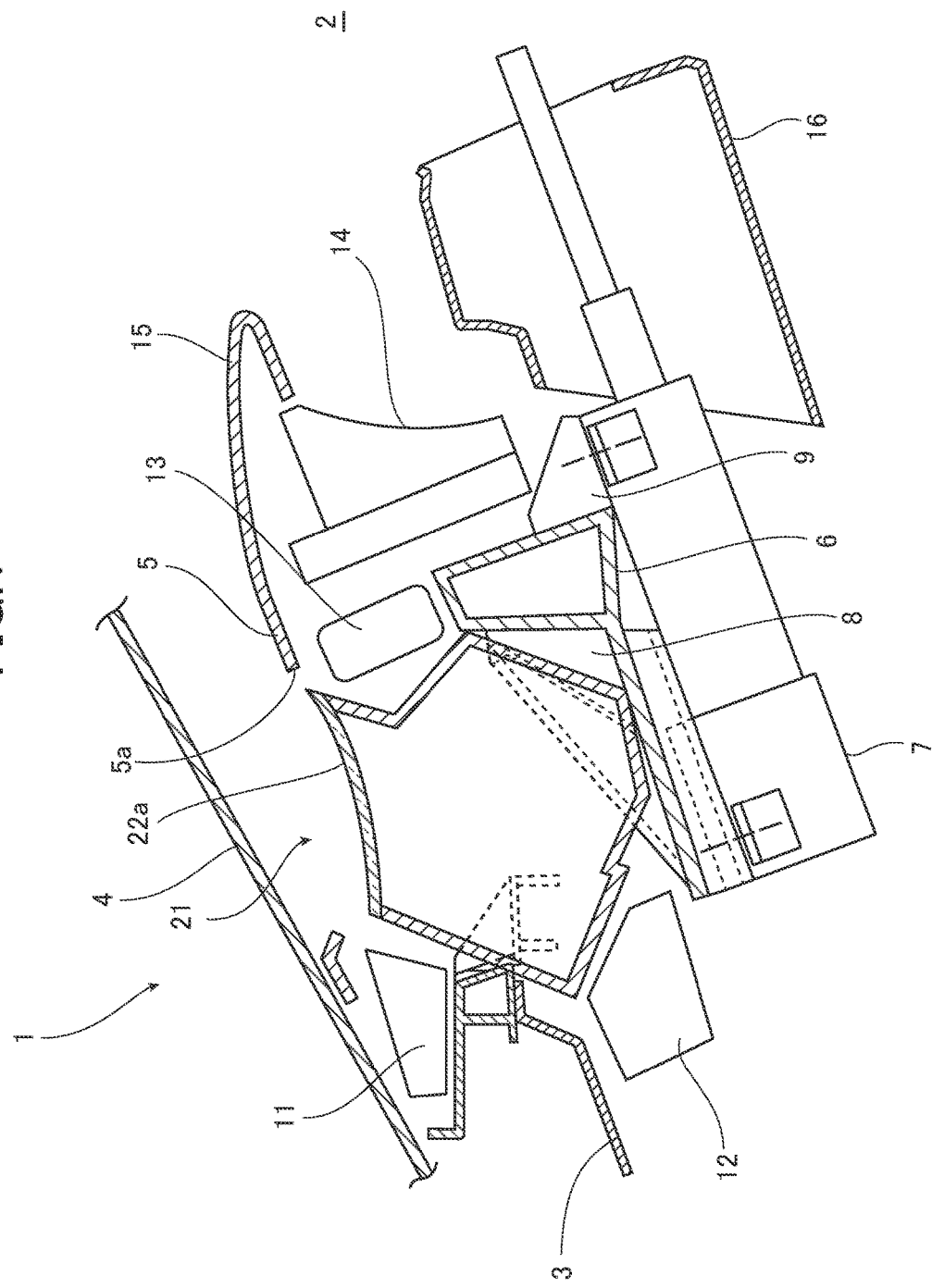
FIG. 1 is a longitudinal sectional view illustrating an instrument panel including a head-up display apparatus according to an embodiment of the present invention.

As illustrated in FIG. 1, a windshield 4 and a front wall panel 3 are vertically provided in a front part of a cabin 2 of a vehicle 1 such as an automobile. An instrument panel 5 is provided under the windshield 4 to cover the front wall panel 3.

A vehicle body strength member 6 extending in a vehicle width direction (direction orthogonal to FIG. 1) is disposed inside the instrument panel 5 to be positioned on a vehicle rear side of the front wall panel 3 (right side in FIG. 1). A column bracket for attaching a steering column 7 is provided in a lower part of the vehicle body strength member 6. In this case, the column bracket is divided into a lower column bracket 8 positioned on the vehicle front side and an upper column bracket 9 positioned on the vehicle rear side. The steering column 7, the lower column bracket 8, and the upper column bracket 9 are fastened approximately in the vertical direction by a fastener such as a bolt and a nut.

Air conditioning ducts 11, 12, a bundle of electric wires such as a harness 13, and an instrument device 14 are provided in order from the vehicle front side in the upper part of the inside of the instrument panel 5. A meter hood 15 that covers the upper part of the instrument device 14 is integrally or separately attached to the instrument panel 5. A column cover 16 is attached to a part of the steering column 7 that projects toward the vehicle rear side from the instrument panel 5.

The front wall panel 3 is a metal panel such as a dash panel provided between the cabin 2 and an engine room. The front wall panel 3 is provided under the windshield 4. The vehicle body strength member 6 is referred to as a cross car beam or a steering support member, and is usually a circular pipe made from metal such as iron. In this case, the vehicle body strength member 6 has a non-circular cross section, for example, a triangular section or a rectangular section. The vehicle body strength member 6 is made from metal such as iron or aluminum or from light alloy such as aluminum alloy or magnesium alloy. The air conditioning duct 11 is an anti-fog defroster duct that blows out conditioning air to the windshield 4. Another air conditioning duct 12 is a ventilator duct that blows out conditioning air to a passenger. In this case, the air conditioning duct 12 is disposed under the air conditioning duct 11.

Figure 2:
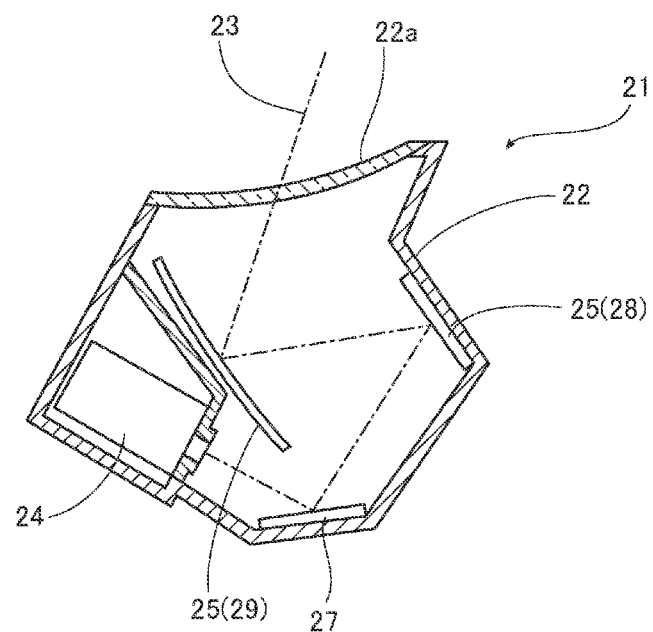
FIG. 2 is a longitudinal sectional view illustrating the head-up display apparatus in FIG. 1.
Figure 3:
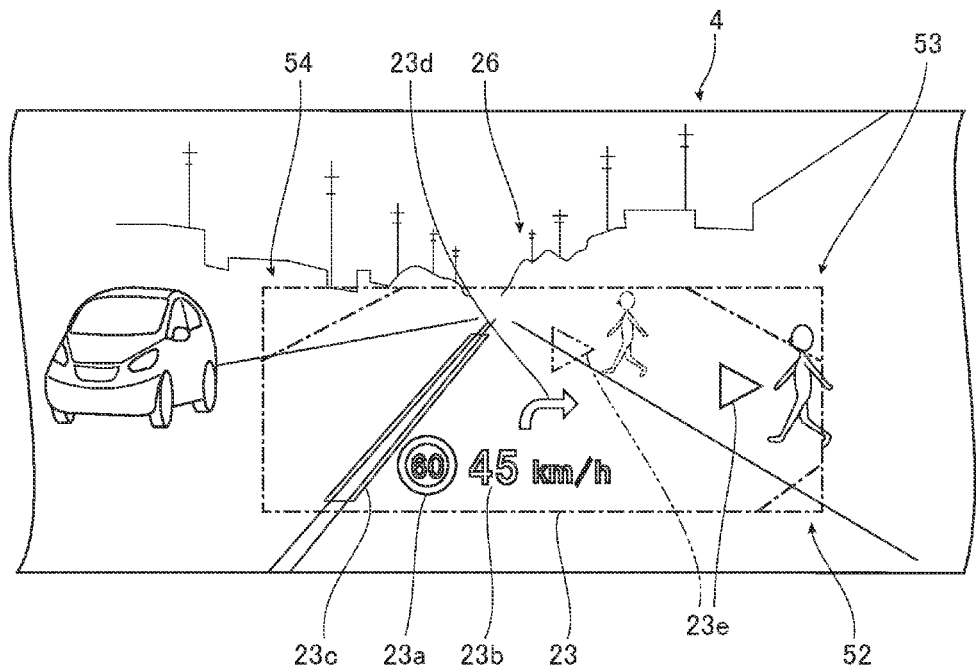
FIG. 3 is a view illustrating an image that is superimposed on an external landscape by the head-up-display apparatus.

A head-up display apparatus 21 is mounted between the air conditioning duct 11 and the harness 13 in the upper part of the lower column bracket 8. As shown in FIG. 2, the head-up display apparatus 21 includes inside a casing 22 thereof an image display 27 capable of displaying an image 23 such as driving information and an optical path forming member 25 that guides the image 23 displayed on the image display 27 to the cabin 2. As illustrated in FIG. 3, the head-up display apparatus 21 is configured to display a virtual image of the image 23 to be superimposed on an external landscape 26 seen through the windshield 4 of the vehicle 1. Note that, this figure illustrates a left-hand drive vehicle.

In this case, the image display 27 may be a screen, a liquid crystal display panel, or VFD (fluorescent indicator tube) on which the image 23 is projected from a projector 24 capable of forming the image 23.

Referring to FIG. 2, the optical path forming member 25 includes a single or a plurality of reflection mirrors 28, 29 that reflects the image 23 displayed on the image display 27 to be guided to the windshield 4.

For example, the front reflection mirror 28 is a plane mirror or a convex mirror, and the rear reflection mirror 29 is a concave mirror or a magnifying lens. The rear reflection mirror 29 projects the vertically reversed image 23. The rear reflection mirror 29 has a size larger than that of the front reflection mirror 28 to project the large image 23 on the windshield 4. As shown in FIG. 1, a dust-proof cover such as a transparent window 22a is provided in the upper part of the casing 22 to reflect the image 23. An opening 5a is provided in a part of the instrument panel 5 which faces the transparent window 22a.

As shown in FIG. 3, the external landscape 26 includes on the upper side thereof sky, on the lower side thereof a road such as a driving lane, an opposing lane, and a sidewalk, and on both sides of an intermediate portion between the upper side and the lower side buildings and street trees.

The image 23 is mainly projected with respect to the road on the lower side of the landscape 26. A limiting speed 23a and a present speed 23b are displayed side by side with respect to the center portion on the lower side of the image 23. A line and an arrow showing a center line 23c of a road and a traveling direction 23d of a vehicle are displayed on the upper side of the image 23. An attention mark 23e for a pedestrian is displayed on the sidewalk side.

The present embodiment includes the following components in addition to the basic components described above.

Figure 4:
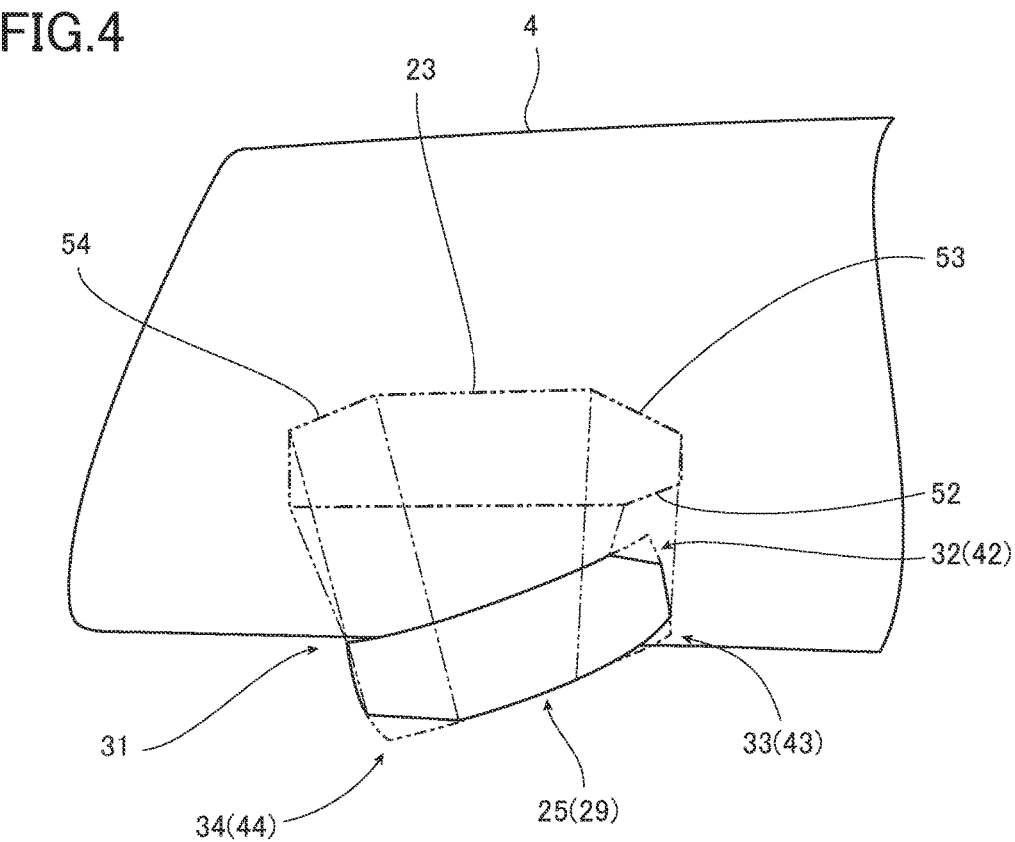
FIG. 4 is a view illustrating a relationship between a reflection mirror and the image projected on a windshield.
Figure 5:
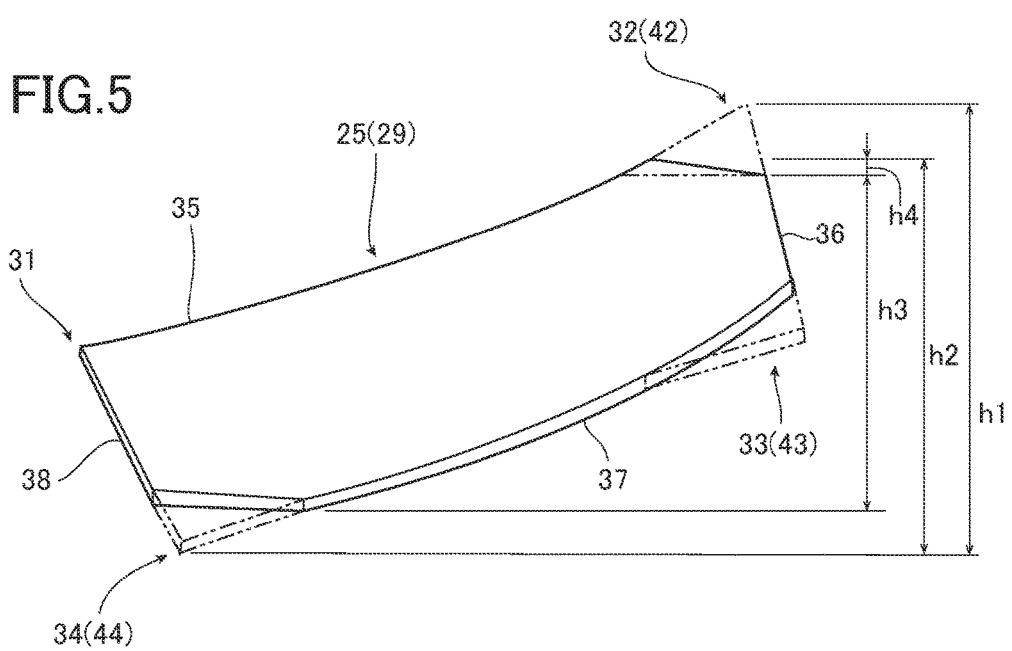
FIG. 5 is a view illustrating a shape of the reflection mirror.

(1) As shown in FIGS. 4, 5, each of the reflections mirrors 28, 29 has a quadrilateral shape as a basic shape. Each of the quadrilateral reflection mirrors 28, 29 (in particular, reflection mirror 29) has four corners 31 to 34. At least one corner of the four corners 31 to 34 of each quadrilateral reflection mirror 28, 29 has a recess 42 to 44.

In this case, each reflection mirror 28, 29 having the quadrilateral shape as the basic shape has a horizontally long rectangular shape having a screen shape similar to that of the image 23. The quadrilateral shape as the basic shape is meant by a rectangular shape when the reflection mirror 29 has a flat surface. Such a basic shape of the reflection mirror 29 is curved according to needs. The recess 42 to 44 is mainly formed in the rear reflection mirror 29 as a large magnifying lens. A recess similar to the recess 42 to 44 may be formed in the front reflection mirror 28 according to needs although the recess of the front reflection mirror 28 is not illustrated. When the recess is formed in the front reflection mirror 28, the recess is formed in a position associated with the recess 42 to 44 of the rear reflection mirror 29.

(2) The recess 42 to 44 is provided in at least a corner 32 to 34 of the image 23 corresponding to a position which is less frequently used.

The position which is less frequently used corresponds to top corners and bottom corners of the image 23 projected on the windshield 4, as shown in FIG. 3. Both of a right top corner and a left top corner of the top corners correspond to the position which is less frequently used. The bottom corner on the vehicle center side, i.e., a right bottom corner for a left hand drive vehicle or/and a left bottom corner for a right hand drive vehicle corresponds to the position which is less frequently used.

Namely, the top corners of the image 23, i.e., the right top corner and the left top corner correspond to the border between the sky and the road in the external landscape 26, which is a position at which the buildings and the street trees on both sides are sequentially seen as going through outside. Such a position is slightly displaced outside from the position at which the attention mark 23e for a pedestrian is displayed.

The bottom corner of the image 23 on the vehicle center side, i.e., the right bottom corer for a left hand drive vehicle and the left bottom corner for a right hand drive vehicle corresponds to the position very close to a vehicle on the sidewalk side in the external landscape 26. Such a position is slightly displaced outside from the position at which the display of the attention mark 23e for a pedestrian is removed.

These positions correspond to the corner portions 32 to 34 of the right bottom corner, the left bottom corner, and the right top corner for a left hand drive vehicle or the left top corner for a right hand drive vehicle in the reflection mirror 29 which vertically reverses the image 23.

(3) The recess 42 to 44 is a cutting line by a straight line or a smooth curved line connecting a first and a second long sides 35, 37 and short sides 36, 38 of the reflection mirror 29 having the quadrilateral shape as the basic shape.

The smooth curved line is meant by a curved line without drastic change and remarkable irregularity. The smooth curved line includes a combination of a straight line and a curved line (for example, chamfered part), a large circular arc having a large curvature radius, and a free curved line close to a straight line.

(4) The reflection mirror 29 having the quadrilateral shape as the basic shape is disposed in the casing 22 to be inclined with respect to the horizontal direction, as shown in FIG. 5. The recess 42 to 44 is provided in at least one of the top corner 32 and the bottom corner 34 which are diagonally placed in the inclined reflection mirror 29.

As the windshield 4 has a free-form surface which is not a vertical flat surface, is inclined backward the vehicle, and is curved into a convex shape in the vehicle width direction and the vehicle longitudinal direction, the reflection mirror 29 is disposed to be inclined with respect to the horizontal direction. The inclined reflection mirror 29 corrects the direction of the image 23 to be horizontally projected on the inclined curved windshield 4. In this case, the inclination of the reflection mirror 29 is a rising slope toward the vehicle center side. For example, the top corner 32 corresponds to the right top corner and the bottom corner 34 corresponds to the left bottom corner for a left hand drive vehicle. As is not specifically described, the top corner 32 corresponds to the left top corner and the bottom corner 34 corresponds to the right bottom corner for a right hand drive vehicle. In the figure, both of the top corner 32 and the bottom corner 34 are provided with the recesses, respectively.

(5) The recess 42 to 44 is horizontally formed in the inclined reflection mirror 29.

In this case, the horizontality is based on the reflection mirror 29 which is housed in the casing 22 and is attached to a vehicle body. The horizontality may include a slight inclination which is substantially considered as a horizontal.

(6) Alternatively, the reflection mirror 29 having the quadrilateral shape as the basic shape may include the recess 41 to 44 (recess 41 is not illustrated) for all of the corners 31 to 34.

(Effect) According to the present embodiment, the following effects are achieved.

(1) The head-up display apparatus 21 is configured to display the image 23 such as driving information by the image display 27 provided inside the casing 22. The image 23 is guided to the cabin 2 by the optical path forming member 25 to be projected on the windshield 4. The virtual image of the image 23 is thereby visible in front of a driver, i.e., in front of an eye line. As a result, the virtual image of the image 23 is displayed to be superimposed on the external landscape 26 seen through the windshield 4 of the vehicle 1.

In this case, in the optical path forming member 25, for example, the image 23 is projected on the image display 27 (screen) by the projector 24, or the image 23 is directly displayed by a liquid crystal display panel or VFD (fluorescent display), and the image 23 displayed on the image display 27 is reflected by the reflection mirrors 28, 29 to be guided to the cabin 2. The image 23 is enlarged by using the magnifying lens for the reflection mirror 29.

At least one corner of the four corners 31 to 34 of the reflection mirror 29 having the quadrilateral shape as the basic shape includes the recess 42 to 44. The reflection mirror 29 thus decreases in size by the recess 42 to 44 even though a basic size is the same. The head-up display apparatus 21 thereby decreases in size. That is, both of the increase in the size of the image 23 and the decrease in the size of the head-up display apparatus 21, which are contrary to each other, can be achieved. As a result, the mounting space of the head-up display apparatus 21 is reduced relative to the vehicle 1. More specifically, the head-up display apparatus 21 capable of projecting the large image 23 is reasonably mounted on a narrow space inside the instrument panel 5.

(2) The recess 42 to 44 is provided in the corner 32 to 34 corresponding to the positon in the image 23 which is less frequently used. The recess 42 to 44 can be thereby provided without losing a necessary part of the image 23 and being recognized by a passenger.

(3) The recess 42 to 44 is a cutting line by a straight line or a curved line connecting the first and second long sides 35, 37 and short sides 36, 38 of the reflection mirror 29. The part of the image 23 to be omitted becomes thereby indistinctive, and the recess 42 to 44 is easily provided in the reflection mirror 29.

(4) The recess 42 to 44 is provided in at least one of the top corner 32 and the bottom corner 34 which are diagonally placed in the reflection mirror 29 disposed to be inclined in the casing 22.

The height of the reflection mirror 29 is reliably lowered (h1>h2, h3) by one or both of the top corner 32 and the bottom corner 34. For example, when the recesses 42, 44 are provided in both of the top and bottom corners 32, 34, the height h3 of the reflection mirror 29 is reduced by about 25% compared to a height (h1) of a reflection mirror without the recess 42 to 44.

(5) The recess 42 to 44 is horizontally formed in the inclined reflection mirror 29. The height of the reflection mirror 29 is thereby further effectively lowered by a small cutting amount (h2−h4).

(6) The recess 41 to 44 (recess 41 is not illustrated) may be formed for all of the corners 31 to 34 of the reflection mirror 29 having the quadrilateral shape as the basic shape. The reflection mirror 29 thereby has a polygonal shape closely related to an ellipsoidal shape or a relatively well-balanced shape similar to such a polygonal shape. The reflection mirror 29 is therefore easily manufactured, and the reflection mirror 29 is easily disposed. The basic shape of the reflection mirror 29 may therefore be increased by the recesses of all the corners 31 to 34, and the size of the screen may also be further increased.

Although the embodiment has been described with reference to the drawings, it should be understood that the embodiment is only an example of the present invention. The present invention should not be limited to the embodiment, and it should be appreciated that variations and modifications may be made in the embodiments described by persons skilled in the art without departing from the gist of the present invention. Further, when the embodiment includes a plurality of elements, any possible combinations of these elements may be possible even without a detailed description. Furthermore, when several embodiments are described in the present invention, any possible combinations of these configurations that may even across these embodiments may be possible even without a detailed description. Additionally, when the term "and the like", is used, it means it covers similar elements. Further, when the terms "substantially", "about", "around", etc. are used, it should be considered that they cover ranges and/or accuracy within a technical common sense understood by persons skilled in the art.

CROSS-REFERENCE TO RELATED APPLICATION

Description of Reference Sign
1 Vehicle
2 Cabin
4 Windshield
21 Head-up display apparatus
22 Casing
23 Image
25 Optical path forming member
26 External landscape
27 Image display
28 Reflection mirror
20 Reflection mirror
31 Corner (reflection mirror)
32 Corner (reflection mirror)
33 Corner (reflection mirror)
34 Corner (reflection mirror)
35 First long side
36 Short side
37 Second long side
38 Short side
41 Recess
43 Recess
44 Recess
52 Corner (image)
53 Corner (image)
54 Corner (image)

The invention claimed is:

1. A head-up display apparatus comprising in a casing thereof:
   an image display that displays an image; and
   an optical path forming member that guides to a cabin the image displayed on the image display,
   wherein the optical path forming member comprises at least a reflection mirror that reflects the image displayed on the image display, and
   the head-up display apparatus displays the image to be superimposed on an external landscape seen through a windshield of a vehicle, wherein
   the reflection mirror has a quadrilateral shape as a basic shape,
   the reflection mirror having the quadrilateral shape as the basic shape comprises a recess in at least one of four corners,
   the reflection mirror having the quadrilateral shape as the basic shape is disposed in the casing to be inclined relative to a horizontal direction, and
   the recess is provided in at least one of a top corner and a bottom corner which are diagonally placed in the inclined reflection mirror.

2. The head-up display apparatus according to claim 1, wherein the recess is a cutting line by a straight line or a smooth curved line connecting adjacent sides of the reflection mirror having the quadrilateral shape as the basic shape.

3. The head-up display apparatus according to claim 1, wherein the recess is horizontally formed in the inclined reflection mirror.

4. The head-up display apparatus according to claim 2, wherein the recess is horizontally formed in the inclined reflection mirror.

5. The head-up display apparatus according to claim 1, wherein the recess is provided in the corner of the reflection mirror corresponding to a position in the image which is less frequently used.

6. A head-up display apparatus comprising:
   an image display that displays an image;
   a reflection mirror that reflects the image displayed on the image display to project the image onto a windshield of a vehicle; and
   a casing in which the reflection mirror is housed,
   wherein
   the reflection mirror has a quadrilateral shape as a basic shape, and a curved surface,
   the reflection mirror having the quadrilateral shape as the basic shape comprises, in at least one of four corners, a recess, and
   the reflection mirror is disposed inside the casing such that the recess is located in a lower portion of the reflection mirror.

7. A head-up display apparatus comprising:
   an image display that displays an image;
   a reflection mirror that reflects the image displayed on the image display to project the image onto a windshield of a vehicle; and
   a casing in which the reflection mirror is housed,
   wherein
   the reflection mirror has a polygonal shape including a first long side that is located in an upper portion of the reflection mirror, and inclines upward, a second long side that is located in a lower portion of the reflection mirror, short sides that are provided between the first long side and the second long side, and a recess that is provided between the short side and an upper end of the first long side to lower a height of the reflection mirror, and
   the reflection mirror is disposed inside the casing.

8. A head-up display apparatus comprising:
   an image display that displays an image;
   a reflection mirror that reflects the image displayed on the image display to project the image onto a windshield of a vehicle; and
   a casing in which the reflection mirror is housed,
   wherein
   the reflection mirror has a polygonal shape including a first long side that is located in an upper portion of the reflection mirror, a second long side that is located in a lower portion of the reflection mirror, and inclines downward, short sides that are provided between the first long side and the second long side, and a recess that is provided between the short side and a lower end of the second long side to lower a height of the reflection mirror, and
   the reflection mirror is disposed inside the casing.

9. The head-up display apparatus according to claim 6, wherein
   the recess is provided at least in a corner of the reflection mirror corresponding to a position of a low usage frequency in the image.

10. The head-up display apparatus according to claim 6, wherein
    the reflection mirror is a front reflection mirror that firstly reflects the image displayed on the image display, and
    the casing includes inside thereof a back reflection mirror that reflects the image reflected by the front reflection mirror toward the windshield.

11. The head-up display apparatus according to claim 6, wherein
    the casing includes inside thereof a front reflection mirror that firstly reflects the image displayed on the image display, and
    the reflection mirror is a back reflection mirror that reflects the image reflected by the reflection mirror toward the windshield.

12. The head-up display apparatus according to claim 10, wherein
    the recess of the reflection mirror is formed in a lower-right corner, a lower-left corner, an upper-left corner in a right hand drive vehicle, or an upper-right corner in a left hand drive vehicle, and has a size by which a part of the image of the image display is lost.

13. The head-up display apparatus according to claim 11, wherein
    the recess of the reflection mirror is formed in a lower-right corner, a lower-left corner, an upper-left corner in a right hand drive vehicle, or an upper-right corner in a left hand drive vehicle, and has a size by which a part of the image of the image display is lost.

14. The head-up display apparatus according to claim 7, wherein
    the recess is provided at least in a corner of the reflection mirror corresponding to a position of a low usage frequency in the image.

15. The head-up display apparatus according to claim 7, wherein
    the reflection mirror is a front reflection mirror that firstly reflects the image displayed on the image display, and
    the casing includes inside thereof a back reflection mirror that reflects the image reflected by the front reflection mirror toward the windshield.

16. The head-up display apparatus according to claim 7, wherein
    the casing includes inside thereof a front reflection mirror that firstly reflects the image displayed on the image display, and the reflection mirror is a back reflection mirror that reflects the image reflected by the reflection mirror toward the windshield.

17. The head-up display apparatus according to claim 15, wherein
the recess of the reflection mirror is formed in a lower-right corner, a lower-left corner, an upper-left corner in a right hand drive vehicle, or an upper-right corner in a left hand drive vehicle, and has a size by which a part of the image of the image display is lost.

18. The head-up display apparatus according to claim 16, wherein
the recess of the reflection mirror is formed in a lower-right corner, a lower-left corner, an upper-left corner in a right hand drive vehicle, or an upper-right corner in a left hand drive vehicle, and has a size by which a part of the image of the image display is lost.

19. The head-up display apparatus according to claim 8, wherein
the recess is provided at least in a corner of the reflection mirror corresponding to a position of a low usage frequency in the image.

20. The head-up display apparatus according to claim 8, wherein
the reflection mirror is a front reflection mirror that firstly reflects the image displayed on the image display, and
the casing includes inside thereof a back reflection mirror that reflects the image reflected by the front reflection mirror toward the windshield.

21. The head-up display apparatus according to claim 8, wherein
the casing includes inside thereof a front reflection mirror that firstly reflects the image displayed on the image display, and
the reflection mirror is a back reflection mirror that reflects the image reflected by the reflection mirror toward the windshield.

22. The head-up display apparatus according to claim 20, wherein
the recess of the reflection mirror is formed in a lower-right corner, a lower-left corner, an upper-left corner in a right hand drive vehicle, or an upper-right corner in a left hand drive vehicle, and has a size by which a part of the image of the image display is lost.

23. The head-up display apparatus according to claim 21, wherein
the recess of the reflection mirror is formed in a lower-right corner, a lower-left corner, an upper-left corner in a right hand drive vehicle, or an upper-right corner in a left hand drive vehicle, and has a size by which a part of the image of the image display is lost.

* * * * *